United States Patent [19]

Benson et al.

[11] Patent Number: 4,913,760
[45] Date of Patent: Apr. 3, 1990

[54] METHOD OF MANUFACTURING A DRIED, THERMOFORMABLE, PAINT-COATED SHEET MATERIAL HAVING GLOSS AND SMOOTHNESS

[75] Inventors: John E. Benson; Larry K. Maier; Gerald G. Reafler, all of Rochester, N.Y.

[73] Assignee: Eastman Kodak Company, Rochester, N.Y.

[21] Appl. No.: 237,128

[22] Filed: Aug. 29, 1988

[51] Int. Cl.$^4$ .................. B29C 47/04; B32B 31/26
[52] U.S. Cl. .................. 156/244.11; 156/244.24; 156/246; 156/247; 427/379; 427/393.5; 427/407.1; 427/420
[58] Field of Search .............. 156/243, 244.11, 244.24, 156/246, 247, 282, 307.5, 311, 499; 427/372.2, 374.2, 377, 379, 420, 393.5, 407.1; 34/12, 13, 18, 22, 23, 26, 30

[56] References Cited

U.S. PATENT DOCUMENTS

| | | | |
|---|---|---|---|
| 2,850,769 | 9/1958 | Zeigler et al. | 156/243 |
| 3,266,966 | 8/1966 | Patchell | 156/243 |
| 3,423,273 | 1/1969 | Mazur | 156/243 |
| 3,620,872 | 11/1971 | Blackwell et al. | 156/231 |
| 3,650,880 | 3/1972 | Tieniber | 161/89 |
| 4,233,358 | 11/1980 | Jones et al. | 428/246 |

FOREIGN PATENT DOCUMENTS 0230364  7/1987  European Pat. Off. .

Primary Examiner—Caleb Weston
Attorney, Agent, or Firm—William J. Davis

[57] ABSTRACT

In the manufacture of a paint-coated stretchable film which is useful as a covering for automobile panels and other articles, a stretchable carrier film is formed by extruding a thermoplastic polymer composition onto a heat resistant temporary carrier film. The extruded layer is coated with paint or other layers and dried initially at a moderate temperature and finally at a high temperature which exceeds the heat deformation temperature of the stretchable carrier film but not of the heat resistant temporary carrier film. This shortens drying time and/or reduces residual solvents in the dried layers. The temporary carrier film, which is later stripped away, resists deformation of the laminate as it is drawn under tensile stress through the coating and high temperature drying stages.

12 Claims, 2 Drawing Sheets

METHOD OF MANUFACTURING A DRIED, THERMOFORMABLE, PAINT-COATED SHEET MATERIAL HAVING GLOSS AND SMOOTHNESS

FIELD OF THE INVENTION

This invention relates to a method of coating and drying polymeric layers on a flexible and stretchable thermoplastic polymer film.

BACKGROUND OF THE INVENTION

As an improvement over the spray painting of articles such as automobile bodies and household appliances, a new kind of sheet material has been developed to provide protective and decorative coatings. The new material comprises a thin, flexible, stretchable, thermoplastic support sheet, known as a carrier film, which has a protective and decorative paint layer of uniform thickness on one side and, optionally, an adhesive layer on the other side. It can also have other layers such as a tie or bonding layer between the paint and the carrier film and a clear coat over the paint or basecoat layer. Using the known procedure of thermoforming, the sheet material can be stretched and bonded to an article such as an automobile body panel. Important advantages over spray painting include economy in the use of paint and avoidance of air pollution by evaporating solvents. Furthermore, the new material has a remarkably more attractive appearance than spray painted finishes.

The new type of sheet material and a process for its manufacture are described in the G. G. Reafler U.S. patent application Ser. No. 116,426, filed Nov. 3, 1987. The process involves providing a laminar flow of the coating composition on the surface of the thermoplastic carrier film to form a layer of substantially uniform thickness, followed by a drying procedure, then coating and drying each additional layer in sequence to obtain a finished product of excellent gloss and smoothness.

In manufacturing the new type of sheet material each coating is dried before the next is applied. Thus, the tie coat is coated and then dried before the paint layer is applied and the later is dried before the topcoat is coated and then dried. To obtain films with superior surface qualities each drying operation preferably is carried out slowly.

As an improvement in the manufacture of the sheet material, a method of drying the paint layer has been developed which reduces the occurence of bubble defects. It has been described in the copending Fronheiser et al U.S. patent application Ser. No. 166,083 filed Mar. 9, 1988, now U.S. Pat. No. 4,872,270. Although this drying method is highly effective, it does require lengthy drying periods, e.g., of the order of 10 minutes or more for the final stage drying and curing of the paint layer.

A principal reason for the slowness of the drying operation is that the carrier film, which necessarily is thermoplastic so that it can be stretched during thermoforming to automobile parts, must be dried at a temperature below its thermal deformation temperature. At such moderate temperatures the drying time is lengthy and adds to the cost of the process.

Furthermore, it has been found that in drying water-based paint layers which also contain high boiling organic solvents, moderate temperatures do not reduce the residual solvents to the lowest possible levels even when the drying time is lengthened. Retention of residual high boiling solvents can adversely affect the adhesion of the layers to the carrier film and possibly also the surface qualities of the coated film. A need has existed for a method which shortens the drying times for each coating or permits higher final drying temperatures, or both, and which reduces the residual solvent content to desirably low levels. In accordance with the present invention such a method is provided.

The extrusion of a polymer film onto another film is known. Furthermore, others have proposed to form a releasable lamination of a very flexible and easily deformable film and a stronger film in order to apply paint coatings to the easily deformable film by knife coating or the like. Such procedures, however, do not suggest that the drying of a layer coated on a heat deformable carrier film can be improved by releasably laminating the carrier film to a heat resistant temporary carrier film, then applying the layer by laminar flow coating and drying it initially at a moderate temperature and finally at a high temperature above the heat deformation temperature of the carrier film.

The Backwell U.S. Pat. No. 3,620,872 discloses a method for making a multilayer web material wherein a polymer coating is applied to a stable carrier web such as a polyester film. The patent offers no suggestion of providing a way to increase the drying stage temperature and shortening the drying time for a paint-coated stretchable, thermoplastic film.

The Jones et al U.S. Pat. No. 4,233,358 discloses a method for the production of stretchable coated textile fabrics and involves a transfer coating technique. Again there is nothing to suggest a way of reducing the drying time and the residual solvents content for a paint-coated thermoplastic film.

The Tieniber U.S. Pat. No. 3,650,880 discloses the manufacture of a porous polymer-coated fabric by applying a polyurethane film to a carrier member, applying a second film to the first one and then a fabric material. The carrier member is stripped from the first film layer. The carrier is a metal band or a belt of fabric or paper (col. 1, line 46) and is said to be "heat resistant so as not to be affected by the drying heat." (col. 1, lines 50–51.) There is no suggestion of making a sheet material of the kind made by applicants nor of the drying of a paint layer initially at a moderate temperature and then finally at a high temperature to a very low residual solvent content.

BRIEF SUMMARY OF THE INVENTION

The present invention provides a new method of coating and drying layers on flexible and stretchable carrier films whereby carrier film webs can be drawn through continuous coating and drying operations at elevated temperatures and under substantial tensile stress without stretching or otherwise deforming them. As a consequence they are dried at higher temperatures and/or for shorter drying times than was heretofore feasible and the residual solvents content of dried layers can be markedly reduced.

The method of the invention comprises continuously extruding a layer of a flexible and stretchable film-forming thermoplastic polymer composition (a) onto a continuously moving web of a temporary carrier film of composition (b) which has a heat deformation temperature higher than the glass transition temperature, $T_g$, of polymer composition (a). The extruded molten polymer is pressed into bonding contact with the moving web and cooled to form a laminated web of releasably bonded layers. The resulting laminated web is continuously drawn through a coating zone in contact with a coating liquid extruded in laminar flow from the slot of an extrusion hopper to coat a uniform liquid layer on the extruded flexible polymer layer. The coated web is continuously drawn through a series of drying stages of successively higher temperatures. These include initial drying stages and a final drying stage. Air is introduced into each stage to cause evaporation of liquid from the coated layer. In the final stage the air is at a temperature above the Tg of composition (a) but below the heat deformation temperature of polymer (b). Thereafter, the laminate is cooled and the temporary carrier film is peeled away from the coated stretchable film which serves as the permanent carrier film.

Especially important is the fact that the method of the invention includes the use of final drying temperatures which are high enough to reduce residual solvents or liquid contents of the coated layers to very low levels, thus improving various properties of the coated films.

THE DRAWINGS

The invention will be further described with reference to the drawings of which

DETAILED DESCRIPTION

The method of the invention is useful for providing a temporary support for a stretchable polymer web while drawing it with substantial tensile stress through coating and drying operations. The method is especially adapted for the manufacture of thermoformable basecoat/clearcoat sheet materials useful in the automotive industry and is therefore being described with reference to the coating of such materials. These sheet materials are also useful, however, as protective and decorative coverings for a wide range of articles, including household appliances such as refrigerators as well as office furniture, copying machines and the like.

The novel method is carried out by extrusion bonding of a stretchable thermoplastic polymer onto a temporary carrier film which can be any of a variety of films which are resistant to deformation at the drying temperatures to be employed, i.e., which have a higher glass transition temperature (Tg) or heat deformation temperature than the extruded permanent carrier film polymer.

Figure 1:
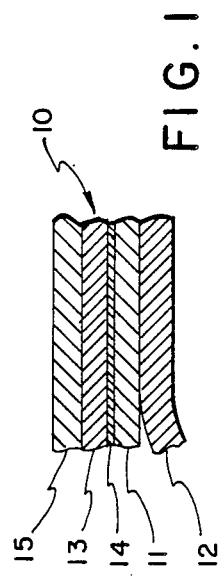
FIG. 1 is a diagrammatic cross-section of a laminated article made by the method of this invention.

FIG. 1 is a diagrammatic cross-sectional side view, not to scale, of a flexible sheet material or film 10 made by the method of this invention. Layer 11 of film 10 is a flexible and stretchable, thermoplastic polymeric carrier film. The latter is referred to herein as the permanent carrier film.

The polymeric materials for the flexible film 11 are stretchable thermoplastic polymers having heat softening and tensile elongation properties suitable for thermoforming or vacuum forming processes. Especially useful are the flexible and stretchable blended polyesters disclosed in the Weemes et al U.S. Pat. No. 4,582,876 of Apr. 15, 1986 entitled "High-Impact Polyester/Styrene-Maleic Anhydride Copolymer Blends."

Releasably bonded to the permanent carrier film 11 is a more heat resistant temporary carrier film 12. The latter is laminated to film 11 by the extrusion method described hereinafter prior to the application of coated layers 13, 14 and 15.

Coated on the flexible carrier film 11 by laminar flow coating is a layer 13, such as a basecoat or paint layer as used for flexible automotive finishes, which has a mean dry thickness from about 0.012 to 0.080 millimeters and, preferably, from about 0.020 to 0.060 millimeters.

The method of the invention is applicable to the forming of various kinds of coatings on flexible and stretchable carrier films which require drawing the film through coating and drying stages with tensile forces that tend to deform the film. It is especially useful, however, with respect to paints and clearcoats which are suitable as automobile finishes and which require thorough drying to remove residual solvents or, in the case of clearcoats, to achieve adequate crosslinking. The invention will be described with reference to such specific kinds of automotive coatings but it should be understood that the method has wider usefulness.

Especially suitable types of coating compositions for use in the method of the invention are aqueous polyurethane paints used for flexible automotive finishes. These include aqueous dispersions of a film-forming polyurethane binder resin and pigment with one or more organic solvents which serve as coalescing agents or the like.

Although not always essential, a thin bonding layer or tie coat 14 can be coated and dried on the carrier film before the paint layer is coated in order to improve the bonding of the paint layer to the permanent carrier film 11. This bonding layer preferably has a dry thickness not greater than about 0.0025 millimeter and thus is much thinner than the dried basecoat.

The final layer is a crosslinked clearcoat layer 15. Crosslinkable clearcoat compositions for coating over basecoats are known in the art. They are transparent and typically comprise a crosslinkable polymer such as a polyester polyol, a polyurethane polyol, or an acrylic polyol; and a crosslinking agent such as a polyisocyanate. Suitable clear topcoat compositions are described in, e.g., Simpson et al U.S. Pat. No. 4,681,811; Ambrose et al U.S. Pat. No. 4,699,814 and Porter U.S. Pat. No. 4,719,132.

The method of the invention is especially advantageous in handling deformable carrier films at temperatures previously not thought suitable. For example, a carrier film made of the polymer blend described in the Weemes et al U.S. Pat. No. 4,582,876, which is a blend of a linear polyester and a rubbery copolymer, can be coated and dried at moderate temperatures as disclosed in Reafler application Ser. No. 116,426 and in Fronheiser et al application Ser. No. 116,083 filed Mar. 9, 1988 to yield an outstanding product.

However, such a film deforms if dried under severe drying conditions of temperature and residence time. The method of the present invention wherein the permanent carrier film is releasably laminated to a more temperature-resistant temporary carrier film makes possible the use of higher final drying temperatures for the various coated layers. This can shorten the length of the drying operations and reduce costs. It can also markedly lower the residual solvents content of the dried layers, with consequent improvement in adhesion and other properties. The method of the invention includes broadly the lamination of any such stretchable thermoplastic, permanent carrier films to a temporary carrier film which is less heat-deformable.

Examples of specific compositions for the tie coat (Table 1), paints (Tables 2-4) and two-component clear coats (Table 5) which can be coated and dried on flexible and stretchable carrier films by the method of the invention are as follows:

TABLE I

| Tie Coat Composition | |
| --- | --- |
| Ingredient | Approx. % Weight |
| Deionized Water | 75 |
| Acrylic Resin | 10 |
| Urethane Resin | 10 |
| N-Methylpyrrolidone | 1 |
| Diethylene Glycol Monobutyl Ether | 1 |
| Ethylene Glycol Monohexyl Ether | <1 |
| N,N-Dimethyl Ethanolamine | <1 |
| FC 170 C Surfactant, sold by 3M Co. | ~0.05 |

TABLE 2

| Paint Composition | |
| --- | --- |
| Ingredient | Approx. % Weight |
| Deionized Water | 50 |
| Urethane Resin | 25 |
| Aluminum Paste | 5 |
| Ethylene Glycol Monohexyl Ether | 5 |
| N-Methylpyrrolidone | 5 |
| Diethylene Glycol Monobutyl Ether | 1 |
| N,N-Dimethyl Ethanolamine | 1 |
| Xylene | 1 |
| Aliphatic Solvent Naphtha | 1 |
| Isopropyl Alcohol | <1 |

TABLE 3

| Paint Composition | |
| --- | --- |
| Ingredient | Approx. % Weight |
| Deionized Water | 5 |
| Urethane Resin | 20 |
| Ethylene Glycol Monohexyl Ether | 5 |
| N-Methylpyrrolidone | 5 |
| Diethylene Glycol Monobutyl Ether | 1 |
| N,N-Dimethyl Ethanolamine Ether | 1 |
| Titanium Dioxide/Mica | <1 |
| Silica | <1 |
| Carbon Black | <1 |
| Isopropyl Alcohol | <1 |

TABLE 4

| Paint Composition | |
| --- | --- |
| Ingredient | Approx. % Weight |
| Titanium Dioxide | 25 |
| Ethylene Glycol Monohexyl Ether | 5 |
| Diethylene Glycol Monobutyl Ether | 1 |
| Deionized Water | 45 |
| N,N-Dimethyl Ethanolamine | 1 |
| N-Methylpyrrolidone | 5 |
| Urethane Resin | 20 |

TABLE 5

| Clear Coat Composition | |
| --- | --- |
| Component | Approx. % Weight |
| A Urethane Resin | 60 |
| Toluene | 40 |
| Benzotriazole | 1 |
| *B Polyfunctional aliphatic | 100 |

TABLE 5-continued

| Clear Coat Composition | |
| --- | --- |
| Component | Approx. % Weight |
| isocyanurate resin based on 1,6-hexamethylene diisocyanate | |

*Available as Desmodur N-3300 from Mobay Corporation Coatings Division.

Figure 2:
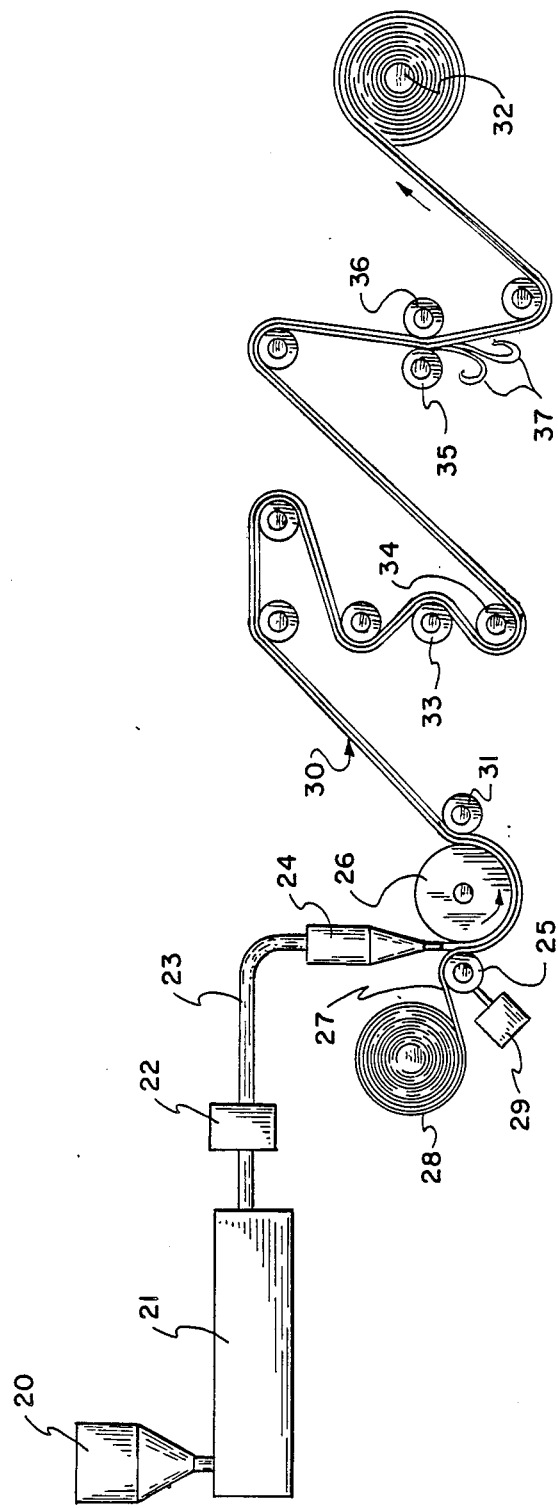
FIG. 2 is a diagrammatic side view of an apparatus in which the carrier film laminate can be formed.

The method of the invention can be carried out in an apparatus such as that illustrated diagrammatically in FIG. 2, wherein pellets of a polymeric composition suitable for the stretchable, permanent carrier film are fed via hopper 20 to a heated extruder 21. After passage through a conventional filter 22 for the removal of polymer slugs or impurities, the molten polymer is fed via melt line 23 to die 24. The die 24, positioned vertically above the nip formed by the rubber covered calendar roll 25 and the casting roll 26, has a narrow horizontal extrusion slot having a width corresponding to the desired width of the layer of film being extruded, and a die gap appropriate for the desired film thickness.

Continuously fed to the nip is a pre-formed web of a relatively high Tg, temporary carrier film 27 supplied from roll 28. Pressure loading means 29 provides the suitable nip pressure to ensure releasable bonding of the extruded highly flexible polymer film to the temporary carrier film 27.

The extruded molten polymer is cooled to form a solid laminate of releasably bonded polymer films. The resulting two-layer laminate 30 is fed over the calendar roll and then allowed a liberal wrap on the casting roll. It is removed over a stripping roll 31 and passes by way of a series of intermediate rollers to a take-up roll 32. The series of intermediate rollers includes resilient rubber-coated rollers 33 and 34 which form a pull-roll nip, and rollers 35 and 36 which, optionally, include edge-trimming means for removal of edges 37.

Figure 3:
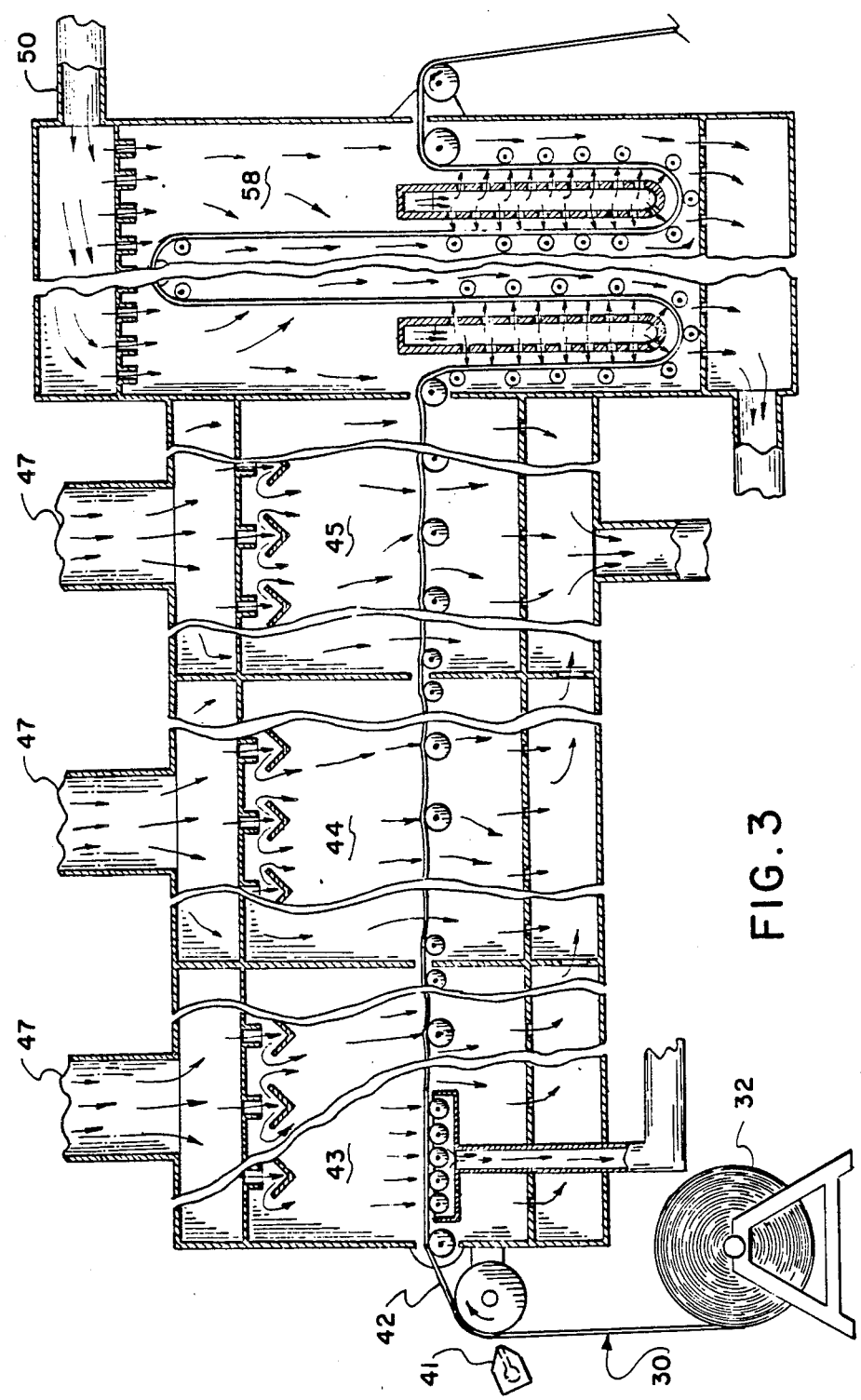
FIG. 3 is a diagrammatic side view of an apparatus for coating and drying layers on the film laminate.

In a subsequent operation as illustrated diagrammatically in FIG. 3, the film laminate is unwound from roll 32 for the coating and drying of layers 13, 14 and 15.

In FIG. 3, the film laminate 30 is drawn continuously from supply roll 32 through a coating zone in contact with a laminar flow of coating liquid provided by coating apparatus 41. Several types of precision coating apparatus for laminar flow coating can be used, including extrusion hoppers, slide hoppers and curtain coating apparatus, as mentioned in the Reafler patent application, Ser. No. 116,426. Preferably the coating apparatus is of the kind used in the precision coating of photographic products as described, for example, in U.S. Pat. Nos. 2,253,060; 2,289,798; 2,681,294; 2,815,307; 2,898,882; 2,901,770; 3,632,374 and 4,051,278.

In the preferred embodiment of FIG. 3, the coating apparatus 41 is an extrusion coating hopper, such as disclosed in the Beguin U.S. Pat. No. 2,681,294, which extrudes in laminar flow a horizontally extending bead of the coating liquid in contact with the moving film laminate web 30. The coating composition is thus coated as a uniform layer onto the surface of the more flexible polymer or permanent carrier film side of the film laminate. This first layer can be the tie coat 14 or the paint coat 13. In any case, the film laminate 30 supplied by roll 32, whether previously uncoated or already coated with one or more layers in a previous pass, is subjected to substantial tension and heat, for a substantial period of time, while being drawn from the coating station and the initial milder drying stages through the final high temperature drying and curing stage or stages.

The drying apparatus can be a flat bed, warm air dryer generally of the type described in the aforementioned Reafler patent application. It can also be modified for preferred conditions of drying of aqueous paint layers as described in the Fronheiser et al copending patent application Ser. No. 166,083 filed Mar. 9, 1988.

The web 42 leaving the coating station 41 of FIG. 3 comprises a film laminate and a wet coating which must be dried. The web 42 is pulled or drawn by take-up rollers not shown in the drawing through successive stages of the drying apparatus. These include initial drying stages 43, 44, 45 and the final curing stage 58. The stages are at successively higher temperatures, the temperatures of the initial stages of the drying zone being mild. This is especially desirable when drying an aqueous paint which contains water and organic solvents. Thus, the drying conditions, including temperature, residence time and humidity, are controlled to cause liquid evaporation but to avoid case hardening of the coating and trapping of liquids.

The final stage or stages, however, are at considerably higher temperatures in the method of the present invention in order to shorten the drying time required to reduce residual liquids to a low level.

For example, heated air is introduced at 27 degrees C., 43 degrees C. and 66 degrees C. via lines 47 and 50 at stages 43, 44 and 45, respectively. In the final stage 58 heated air is admitted via line 50 at a temperature above the Tg of the permanent carrier film, e.g., above about 110 degrees C. At such a high temperature the residence time of the film can be 4 minutes or less and still reduce the residual solvents to a low level.

This reduction of residual organic solvents in the coated layers is especially significant for paint layers in that it contributes to improved adhesion of the layers and to possible improvement in surface qualities. As an example of the capability of the new method, when coating a polyurethane paint composition such as that of Table 4, which contains 10 weight percent of more organic solvents, the residual solvents content of a layer coated at 6000 mg/sq ft (64.5 g/m$_2$) and dried to a thickness of about 0.038 mm, the residual organic solvents in the dried paint layer can be reduced to less than 0.5 weight percent with an air temperature in the final drying stage above about 110° C. and a residence time less than about 4 minutes.

The moving web is also heated from its underside by contact with metal rollers 43 and other rollers in the several drying stages. These metal rollers of high conductivity are heated by the warm air and transfer heat to the web, thus further increasing its temperature. In the final stage 58, the web is heated to its highest temperature as it travels through a vertical path, being guided by so-called air reversers to keep the coated side of the film out of contact with rollers. The dried film leaving stage 58 is pulled under substantial tension, e.g. 6.3 to 8.7 kg/meter of film width (15 to 20 lbs for a film web 42 inches wide) and wound on a take-up roll not shown in the drawing.

As a consequence of heating the moving web for a substantial period of time while drawing it through the high temperature drying stage or stages, the tensile stress on the web exceeds the elastic limit of the unsupported lower Tg carrier film, i.e., if it were not bonded to the temporary carrier film. It does not, however, exceed the elastic limit of the temporary carrier film or of the laminated film 42. Hence, although the entire web is under tension while being heated to a relatively high temperature the lower Tg film component is not stretched or deformed beyond its elastic limit because the higher Tg component (or more heat resistant component) resists such deformation.

After the final layer has been coated and dried the film is wound up. Then, when ready for further use, the temporary carrier film is peeled away from the permanent carrier film and, preferably, recycled. The permanent carrier film can, if desired, be coated on its uncoated side with a pressure sensitive or heat sensitive adhesive layer and dried at moderate temperature. The film is then ready for thermoforming to automobile panels or other substrates. Alternatively, the adhesive coating can be omitted if the coated film is to be bonded to plastic articles in the so-called "in-mold" process.

The permanent carrier films which can be extruded on an laminated to more heat resistant temporary carrier films in accordance with the present invention are stretchable, thermoplastic films made by the extrusion of polymer blends. As already mentioned, a preferred stetchable, permanent carrier film is made from the polymer blends described in Weemes et al U.S. Pat. No. 4,582,876. These are blends of copolyesters based on poly (1,4-cyclohexylenedimethylene terephthalate) and rubber-modified styrene-maleic anhydride copolymers. Such a blend contains (a) 70 to 30 weight percent copolyester consisting of repeating units from terephthalic acid, repeating units from 1,4-cyclohexanedimethanol present in the amount of 25 to 90 mole % and repeating units from a second glycol having 2 to 6 carbon atoms present in the amount of 75 to 10 mol %, and (b) 30 to 70 weight percent thermoplastic rubber-modified vinyl aromatic polymer compositions comprising (1) from 60 to 93% by weight of a nonequimolar copolymer of 70 to 98% by weight based on a copolymer of a vinyl aromatic monomer and from 2 to 30% by weight based on a copolymer of an unsaturated dicarboxylic acid moiety copolymerizable therewith, and (2) from 7 to 40% by weight of at least two differing rubbery additives which were present during the copolymerization of the monomers of component (1), wherein the rubbery additives comprise from 5 to 20% by weight based on the total composition of at least one high vinyl aromatic conjugated diene copolymer wherein the at least one high conjugated diene-vinyl aromatic copolymer comprises from about 60 to about 93% by weight of the conjugated diene. At least one high vinyl aromatic conjugated diene copolymer preferably is a block copolymer which comprises a greater amount of vinyl aromatic than conjugated diene monomer. The carrier film can include addenda such as filler, UV absorbers, plasticizers, colorants and antioxidants.

An example of a specific polymer blend of this kind which can be extruded onto a more heat-resistant temporary carrier film consists of a blend of 55:45% by weight of a copolyester and "Dylark 600" styrene copolymer. The latter is a rubber-modified styrene-maleic anhydride copolymer available from ARCO Chemical Company, a division of Atlantic Richfield Company. The copolyester is derived from terephthalic acid, 19 mole % ethylene glycol and 81 mole % 1,4-cyclohexanedimethanol.

Other examples of stretchable carrier films include the highly flexible and stretchable films which are made by the extrusion of blends described in the Seymour copending application Ser. No. 151,727 filed Feb. 7, 1988. An example of such a composition is a blend of a flexible poly(etherester) with a more rigid polyester, the blend-comprising: Part (A): about 98 to 2 weight % of a flexible poly(etherester) having an I.V. of about 0.8-1.5 and recurring units from (1) a dicarboxylic acid component consisting essentially of 1,4-cyclohexanedicarboxylic acid having a trans isomer content of at least 70%, (2) a glycol component consisting essentially of (a) about 95 to about 65 mol % 1,4-cyclohexanedimethanol, and (b) about 5 to about 35 mol % poly(oxytetramethylene) glycol having a molecular weight of about 1100, and Part (B): about 2 to 98 weight % of a relatively rigid polyester having recurring units from about 80-100 mol % terephthalic acid and at least one aliphatic or cycloaliphatic glycol having 2-12 carbon atoms, said polyester having an I.V. of about 0.5-1.0.

As used herein, the inherent viscosity (I.V.) is measured at 25 degrees C. using 0.50 gram of polyester per 100 ml of a solvent consisting of 60 percent by weight phenol and 40 percent by weight tetrachloroethane.

The dibasic acid component of the poly(etherester) of Part (A) above consists essentially of 1,4-cyclohexanedicarboxylic acid having a trans isomer content of at least 70%, preferably at least 80% and most preferably at least 85% trans isomer content.

The poly(oxytetramethylene) glycol component of Part (A) above is commercially available, and has a molecular weight between about 500 and about 1100, preferably about 1000 (weight average). It is used in an amount of about 5 to about 35 mol %, preferably about 8-15%, based on the total glycol mol %.

The poly(etherester) further may comprise up to about 1.5 mol %, based on the acid or glycol component, of a polybasic acid or polyhydric alcohol branching agent having at least three COOH or OH functional groups and from 3 to 60 carbon atoms. Esters of many such acids or polyols may also be used. Suitable branching agents include trimellitic acid or anhydride, trimesic acid, trimethylol ethane and trimethylol propane.

It should be understood that the total acid reactants should be 100 mol %, and the total glycol reactants should be 100 mol %. Although the acid reactant is said to "consist essentially of" 1,4-cyclohexanedicarboxylic acid, if the branching agent is a polybasic acid or anhydride, it will be calculated as part of the 100 mol % acid. Likewise, the glycol reactant is said to "consist essentially of" 1,4-cyclohexanedimethanol and poly(oxytetramethylene) glycol, if the branching agent is a polyol, it will be calculated as part of the 100 mol % glycol.

The poly(etherester) preferably includes a phenolic antioxidant such as Irganox 1010 antioxidant available from Geigy Chemical. Preferably, the antioxidant is used in an amount of from about 0.1 to about 1.0% based on the weight of poly(etherester).

The trans and cis isomer contents of the final copolyester are controlled in order to give polymers that set up or crystallize rapidly. Cis and trans isomer contents are measured by conventional methods well known to those skilled in the art. See, for example, U.S. Pat. No. 4,349,469.

The poly(etherester) can be prepared by known techniques. See, for example, the Davis et al U.S. Pat. No. 4,349,469 of Sept. 14, 1982.

The polyester used in Part (B) can also be prepared by known techniques using an acid component consisting essentially of terephthalic acid. Minor amounts of other conventionally used dicarboxylic acids (up to about 10%) such as isophthalic, naphthalene dicarboxylic or aliphatic dicarboxylic acids having about 4 to 12 carbon atoms may be used. Conventional glycols, or combinations of glycols for copolymers, having 2 to 12 carbon atoms may be used. The preferred glycols are ethylene glycol, 1,4-butanediol and 1,4-cyclohexanedimethanol, and mixtures thereof. The I.V. of the polyester is about 0.5-1.0.

The heat-resistant temporary carrier films are formed of compositions which can be releasably bonded to thermoplastic, stretchable permanent carrier films and which can withstand high temperatures and tensile stress without deforming. By using temporary carrier films having such properties it is possible to draw the film laminates through coating and drying operations under substantial tensile stress and at high temperatures which can markedly shorten the drying times.

Preferred temporary carrier films are thermoplastic or thermoset polymeric films which have a higher Tg or heat deformation temperature than the permanent carrier film. It is also possible to use non-polymeric films such as metal foils, e.g. aluminum foil, or resin-coated paper which have a heat deformation temperature higher than the permanent carrier film. Polymers are preferred because they are less likely to wrinkle than metal films and do not release fibers which may cause coating defects as is possible with paper webs. The term film is used broadly to include such other web materials.

The temporary carrier films have a Tg or heat deformation temperature higher than the drying temperature, e.g., higher than about 100 degrees C. and, preferably, higher than about 150 degrees C. They are capable of being drawn at tensile stresses above about 20 kg/sq cm at such temperatures without substantial elastic elongation and without permanent elongation. Likewise they bond releasably to the flexible and stretchable carrier films with a low peel strength. Thus the lamination has a bond strength high enough to hold the films together during the coating and drying operations but low enough that the films can be peeled apart afterwards with a small force which does not damage either film. Preferably, the temporary carrier film is recovered with no damage or wrinkling so that it can be recycled.

Examples of polymers having suitable properties for temporary carrier films include polyesters, polyimides, polycarbonates, polyamides and others as illustrated by Hamb U.S. Pat. Nos. 3,634,089 and 3,772,405; Hamb et al U.S. Pat. Nos. 3,725,070 and 3,793,249; Wilson Research Disclosure, Vol. 118, Feb. 1974, Item 11833, and Vol. 120, April 1874, Item 12046; Conklin et al Research Disclosure, Vol. 120, April 1974, Item 12012; Product Licensing Index, Vol. 92, December 1971, Items 9205 and 9207; Research Disclosure, Vol. 101, September 1972, Items 10119 and 10148; Research Disclosure, Vol. 106, February 1973, Item 10613; Research Disclosure, Vol. 117, January 1974, Item 11709, and Research Disclosure, Vol. 134, June 1975, Item 13455.

Especially useful are biaxially oriented films of polyethylene terephthalate having an inherent viscosity greater than about 0.5, e.g., in the range from about 0.55 to 0.65, and a thickness in the range from about 50 to 200 micrometers, with a thickness of 75 to 150 micrometers being preferred.

Films of this kind include "Estar" polyester film of Eastman Kodak Company and "Mylar" polyester film of E.I. duPont DeNemours and Company.

Another useful film is the polycarbonate film sold under the name "Lexan" by General Electric Company. Still another useful film of even higher temperature resistance is "Kapton" polyimide film supplied by DuPont. The polymer is said to be a copolymer of 4,4'-(isopropylidenediphenylene) diamine and pyromellitic dianhydride. Preferred film thicknesses range from about 25 to 125 micrometers.

Not all of the mentioned temporary carrier films are equally suitable in adhesion to the extruded polymer layer. Some adhere strongly (e.g. polyethylene terephthalate) and some weakly (e.g. "Kapton" polyimide). The adhesion can be strengthened in known manner by the use of primers or subbing layers, by the use of corona discharge treatment or flame treatment or other treatment or by adjustments in the extrusion temperature or pressure. It can also be decreased by such adjustments or by treating the film with known release materials.

Since, the stretchable, permanent carrier films are blends of immiscible polymer components, such as a blend of a rubbery polymer and a higher Tg, less flexible polyester, the film will have more than one Tg. One will correspond to that of the low Tg rubbery component and the other to that of the higher Tg polyester. The term "thermal deformation temperature" is used to define the temperature at which the film stretches beyond its elastic limit when subjected to the tensile stress required for drawing it through the coating and drying operations. This thermal deformation temperature will approximate the lowest Tg of a film made of a polymer blend. Also when the Tg of a carrier film is referred to herein, the lowest Tg of the blend is meant.

The invention is further illustrated by the following examples of the manufacture of laminated film webs for coating with paint and clearcoat layers.

EXAMPLE 1

Pellets of a polymer blend composed of Part (A) and Part (B) as described below were dried at 72 degrees C. for 4 hours and then fed to a plastics extruder having a screw diameter of 3.8 cm.

Part (A): 60 weight % of a flexible poly(etherester) having an I.V. of about 1.2 and formed of recurring units from
- 99.5 mol % 1,4-cyclohexanedicarboxylic acid (trans content about 90%)
- 0.5 mol % trimellitic anhydride
- 91.1 mol % 1,4-cyclohexanedimethanol
- 8.9 mol % poly(oxytetramethylene) glycol having a molecular weight of 1000, and Part (B): 40 weight % of a relatively rigid polyester having an I.V. of about 0.75 and formed of recurring units from
- 100 mol % terephthalic acid
- 68 mol % 1,4-cyclohexanedimethanol
- 32 mol % ethylene glycol.

The molten polymer was extruded at a melt temperature of 246-252 degrees C., and an extruder speed of 80 rpm to make a film that was 0.13 mm thick and 29 cm wide at 7.6 m/min (which corresponds to an output rate of about 20 kg/hr.). The melt pressure was 14.5 MPa (2100 psi) at the extruder exit and 5.2 MPa (750 psi) at the die entrance port.

After passage through a 40-micron filter and a 360 cm long melt line having a diameter of 2 cm, the polymer blend exited the die having a width of 35 cm and a gap of 0.50–0.75 mm, to provide a film of the flexible, stretchable polyester blend having a thickness of 0.13 mm and a width of 29 cm. The die was positioned vertically so as to provide for extrusion of the polymer blend into a nip between the highly polished casting wheel and the continuously moving web of a less flexible, temporary carrier film supplied at a rate of 0.6 m/min. The temporary carrier film 17 consisted of a biaxially oriented polyethylene terephthalate film ("Estar" polyester film of Eastman Kodak Company), having a thickness of 0.1 mm, a width of 33 cm, and a Young's modulus of about 4800 MPa. The nickel plated and highly polished casting roll had a 1.4 Ra (average surface roughness in microns) surface finish, a diameter of 25.4 cm and a width of 46 cm. The calendar roll, which had a diameter of 10.2 cm, a width of 36 cm and an unpolished surface, continuously pressed the less flexible polyester film into the desired bonding contact with the extruded polymer blend.

The so formed laminate consisting of a flexible and stretchable permanent carrier film releasably bonded to the temporary carrier film travelled around the casting roll at a wrap angle of 180 degrees before being stripped off by stripping roll which had a diameter of 5.1 cm and a length of 41 cm. The surface temperatures of the casting roll and of the calendar roll were maintained at 27 degrees C. and 43 degrees C., respectively, by an internal hot water flow. The nip pressure of the calendar roll was about 0.69 MPa (100 psi) and the die-to-nip distance ranged from 5.1 to 6.4 cm. The temperatures of the calendar roll and of the casting roll were adjusted as specified above a), to ensure the desired degree of bonding strength between the extruded flexible polymer blend film and the less flexible temporary carrier film and, b), to prevent damage to the film laminate as it was stripped off the casting roll. After leaving the casting roll, the film laminate travelled through a pull roll nip and around a plurality of conveyor rollers to edge trim means where the width of the temporary carrier film was trimmed to the width of the highly flexible polymer film. A roll 107 meters in length was obtained.

EXAMPLE 2

The procedure described in Example 1 was duplicated with the following variations:
(a) Polymer Parts (A) and (B) were blended at a weight ratio of 85 to 15;
(b) Melt temperature was lowered to about 238 degrees C.;
(c) Casting wheel and calendar roll temperatures were raised to 71 degrees C. each;
(d) Extruder rpm and linespeed were reduced to 30 and 4.4 m/min, respectively, to produce a film of 0.13 mm thickness.
(e) Melt pressures at the extruder exit and die entrance were lowered to 12 MPa (1750 psi) and 3.6 MPa (520 psi), respectively; and
(f) The calendar nip pressure was reduced to 0.52 MPa (75 psi)
(g) Edges of the "ESTAR" temporary carrier film were trimmed and a paper interleaf was used in rolling up the laminated web of 61 meters in length.

The laminated webs made as described in Examples 1 and 2 had sufficient dimensional stability to withstand tensile stress at elevated temperature without deforming the highly flexible and stretchable film. The bond strength was high enough to maintain lamination as needed but was low enough to permit peeling apart of the films without damage to either.

Physical properties of the separated film layers of Examples 1 and 2 are illustrated by the data in Tables 6–8 below:

TABLE 6

| Film | Test Dir. | Thk mm | Yield Strength psi × $10^3$ (MPa) | Break Strength psi × $10^3$ (MPa) | Break Elong. % | Young's Modulus, psi × $10^5$ (MPa) |
| --- | --- | --- | --- | --- | --- | --- |
| Ex. 1 | L | 0.124 | 3.0 (20.7) | 65 (44.8) | 316 | 0.8 (550) |
|  | W | 0.122 | 2.4 (16.5) | 4.0 (27.6) | 260 | 0.6 (410) |
| Ex. 2 | L | 0.112 | 2.2 (15.2) | 3.4 (23.4) | 181 | 0.2 (140) |
|  | W | 0.119 | 1.7 (11.7) | 2.8 (19.3) | 258 | 0.2 (140) |
| ESTAR | L | 0.102 | 14.3 (98.5) | 25.5 (175) | 106 | 6.6 (4500) |
|  | W | 0.102 | 14.0 (96.5) | 29.7 (205) | 86 | 7.7 (5300) |

TABLE 7

Peel Force Required to Separate the Films (ASTM F904)

| | |
| --- | --- |
| Example 1 | 0.11 lb/in (0.19 N/cm) |
| Example 2 | 0.03 lb/in (0.05 N/cm) |

TABLE 8

Tensile Yield Strength - Machine Direction (ASTM 0638)

| | |
| --- | --- |
| Example 1 | 2.2 × $10^3$ psi (15 MPa) |
| Example 2 | 3.3 × $10^3$ psi (23 MPa) |
| "ESTAR" Polyester | 14.3 × $10^3$ psi (98 MPa) |

EXAMPLE 3

Extrusion onto Polycarbonate Web

The procedure of Examples 1 and 2 was repeated with the extrusion of another type of permanent carrier film polymer blend onto another type of temporary carrier film, namely, a polycarbonate film web. The polyester blend of the permanent carrier film was of the type described in the Weemes et al U.S. Pat. No. 4,582,876 and consisted of a blend of 55:45% by weight of a copolyester and "Dylark 600" rubber-modified styrene-maleic anhydride copolymer. The copolyester was derived from terephthalic acid, 19 mole % ethylene glycol and 81 mole % 1,4-cyclohexanedimethanol.

This polyester blend was extruded in substantially the same manner as in Example 1 at approximately 280 degrees C. (535 degrees F.) onto a moving web of "Lexan" polycarbonate film which was approximately 138 micrometers in thickness (5.5 mils) and had a Tg well above 125 degrees C. The extruded polyester blend formed a secure laminate layer on the polycarbonate web. The bond was sufficiently strong for subsequent coating and hot air drying of the polyester film layer but the latter could be stripped from the polycarbonate with moderate force and without damage to either film.

EXAMPLE 4

Coating and Drying of Laminate

The laminate of Example 3 was wound on a receiving roll and then fed to a continuous laminar flow coating process and a multi-stage drying process as previously described to form a series of coatings on the polyester blend layer. The web was coated first with a thin tiecoat of the composition shown in Table 1, then with a white, water-based polyurethane paint of the composition shown in Table 4 and finally with a crosslinkable aqueous, two-package polyurethane clearcoat of the composition shown in Table 5.

After each coating step the web was passed through a series of drying stages of successively increasing temperatures as in FIG. 3 of the drawings. Table 9 below records the residual solvent contents of the paint layer for a series of runs which were identical except for the final drying stage temperature.

TABLE 9

| Film Sample | Final Drying Stage Air Temp, degree C. | Residual Organic Solvents Content of Dried Layers g/sq m | | | | |
| --- | --- | --- | --- | --- | --- | --- |
| | | DMAE | NMP | EGHE | DGBE | Total |
| Control | ~90 | 0.383 | 0.206 | 0.108 | 0.237 | 0.934 |
| A | ~90 | 0.346 | 0.200 | 0.108 | 0.244 | 0.898 |
| B | ~100 | 0.294 | 0.181 | 0.108 | 0.235 | 0.818 |
| C | ~112 | 0.114 | 0.113 | 0.085 | 0.174 | 0.486 |
| Orig. Wet Content | | 1.53 | 7.64 | 7.64 | 1.53 | |

1 = N,N-Dimethyl ethanolamine
2 = N-Methylpyrrolidone
3 = Ethylene glycol monohexyl ether
4 = Diethylene glycol monobutyl ether Film samples A, B and C were all coated in the same manner on a permanent polyester carrier film laminated to a temporary polycarbonate carrier film. They were dried initially at the same moderate temperatures. Only the final stage temperature differed, as the table shows. The control sample had no temporary carrier film. The coatings were applied to a polyester blend carrier reduced when the air temperature for the final drying stage for the paint layer was raised to above 110 degrees C. (i.e., above 112 degrees C.) while drying for the same length of time as in the other runs.

Total organic solvents content of the paint layer wad reduced to less than 0.5 weight percent (i.e., 0.486 weight percent). The final stage air temperature was above the Tg of the unsupported polyester blend carrier film. The latter, as represented by the control film, could not be transported through the drying apparatus at such high temperature.

Similar reduction in residual solvent content was obtained when the clearcoat layer of the same films was dried at the same elevated temperature.

The invention has been described in detail with particular reference to preferred embodiments thereof, but it will be understood that variations and modifications can be effected within the spirit and scope of the invention.

We claim:

1. A method of manufacturing a dried, thermoformable, paint-coated sheet material having gloss and smoothness comprising a dried layer of an aqueous paint on a web of a stretchable, permanent carrier film of thermoplastic polymer composition (a), which comprises continuously extruding a molten layer of said thermoplastic polymer composition (a) onto a continuously moving web of a temporary carrier film of composition (b), which has a heat deformation temperature higher than the Tg of composition (a)

pressing the extruded molten polymer composition (a) into bonding contact with the moving web and cooling the extruded layer to form a solid laminate of releasably bonded films of compositions (a) and (b), continuously drawing the resulting laminate through a coating zone in contact with a laminar flow of said aqueous paint to coat a uniform liquid layer of paint on the film of polymer composition (a), said paint containing a polyurethane resin, an organic solvent and water continuously drawing the paint-coated laminate through a series of drying stages of successively higher temperatures, including initial drying stages and a final drying stage, introducing a flow of air to each stage to cause evaporation of water and organic solvent from the paint layer, in the final drying stage providing air at a temperature above the Tg of polymer composition (a) but below the heat deformation temperature of composition (b), cooling the laminate to a temperature below the Tg of polymer composition (a), and thereafter peeling the temporary carrier film away from the paint-coated permanent carrier film.

2. A method according to claim 1 wherein composition (b) is a polymer composition of higher Tg than composition (a).

3. A method according to claim 2 wherein the drying conditions of air temperature and residence time and the tension under which the laminate is drawn through the final drying stage are such as to cause deformation of an unsupported stretchable film of polymer composition (a) but not of the laminate of releasably bonded films of polymer compositions (a) and (b).

4. A method according to claim 2 wherein in the final drying stage the web is heated at an air temperature above 100 degrees C. and the residence time at that temperature is sufficient to reduce the residual organic liquids in the paint layer coated on the film of polymer composition (a) to less than 0.5 weight percent.

5. A method according to claim 2 wherein the laminate is drawn through the final drying stage with a tensile stress greater than the elastic limit of an unsupported film of polymer composition (a) at the web temperature in that stage but less than that of the laminate.

6. A method according to claim 5 wherein the film of polymer composition (b) is a polycarbonate film.

7. A method accordinging to claim 5 wherein the film of polymer composition (b) is a biaxially oriented poly(ethylene terephthalate) film.

8. A method according to claim 2 wherein polymer composition (a) is a blend of a rubbery copolymer and a linear polyester, the film of polymer composition (b) is a biaxially oriented poly(ethylene terephthalate), the aqueous paint is an aqueous polyurethane paint and the air temperature in the final drying stage exceeds 110 degrees C.

9. A method according to claim 2 wherein the aqueous paint is a latex paint containing water, one or more higher boiling organic solvents and a colloidally dispersed, coalescable, hardenable, elastomeric film-forming polymer, the drying conditions prior to the final stage are controlled to cause liquid evaporation but to avoid case hardening of the coating and trapping of liquids and, in the final stage, the drying conditions include an air temperature above 110 degrees C.

10. A method according to claim 9 wherein the residence time in the final drying stage is less than about 4 minutes.

11. A method according to claim 9 wherein the aqueous paint is the polyurethane latex paint, the paint contains higher boiling organic solvents in a total amount of at least about 5 weight percent of the paint composition and wherein the paint layer is heated in the final drying stage to a temperature sufficiently high to reduce the residual organic solvent content of the dried paint layer to less than about 0.5 weight percent.

12. A method according to claim 11 wherein the air temperature in the initial drying stages is high enough to evaporate liquid but low enough to avoid case hardening of the coated layer.

* * * * *